United States Patent
Nicolas (10) Patent No.: US 10,041,533 B2
(45) Date of Patent: Aug. 7, 2018

(54) BEARING HAVING A SHIM BETWEEN TWO RING PARTS

(71) Applicant: Michel Nicolas, Annay La Côte (FR)

(72) Inventor: Michel Nicolas, Annay La Côte (FR)

(73) Assignee: AKTIEBOLAGET SKF, Gothenburg (SE)

(*) Notice: Subject to any disclaimer, the term of this patent is extended or adjusted under 35 U.S.C. 154(b) by 22 days.

(21) Appl. No.: 15/244,667

(22) Filed: Aug. 23, 2016

(65) Prior Publication Data

US 2017/0058949 A1    Mar. 2, 2017

(30) Foreign Application Priority Data

Aug. 25, 2015 (EP) .................................... 15306310

(51) Int. Cl.
*F16C 23/06* (2006.01)
*F16C 25/06* (2006.01)
*F16C 19/36* (2006.01)
*F16C 33/60* (2006.01)
*F16C 19/14* (2006.01)
*F16C 19/34* (2006.01)
*F16C 33/61* (2006.01)

(52) U.S. Cl.
CPC .............. *F16C 23/06* (2013.01); *F16C 19/14* (2013.01); *F16C 19/34* (2013.01); *F16C 25/06* (2013.01); *F16C 33/60* (2013.01); *F16C 19/362* (2013.01); *F16C 33/61* (2013.01)

(58) Field of Classification Search
CPC .... F16C 25/06; F16C 2226/60; F16C 19/166; F16C 19/183; F16C 19/38; F16C 19/548; F16C 19/14; F16C 19/34; F16C 19/362; F16C 33/61; F16C 33/60; F16C 23/06
See application file for complete search history.

(56) References Cited

U.S. PATENT DOCUMENTS 3,802,755 A * 4/1974 Schluter ................ F16C 19/184
                                                        384/455
3,967,867 A * 7/1976 Richardson ............. B66C 23/84
                                                        384/582
(Continued)

FOREIGN PATENT DOCUMENTS

DE        133988 A1    1/1979
DE  102008004070 A1    7/2009
(Continued)

*Primary Examiner* — Alan B Waits
(74) *Attorney, Agent, or Firm* — Bryan Peckjian; SKF USA Inc. Patent Dept.

(57) ABSTRACT

A bearing providing at least two rings able to pivot relative to one another, at least one of the rings including at least two annular ring parts having annular radial surfaces axially opposite each other. The bearing further providing at least one annular shim disposed between the radial surfaces of the annular ring parts and including successive circumferential portions. Each circumferential portion of the shim has a plurality of nicks respectively traversed by axial elements. The nicks of each circumferential portion of the annular shim are shaped and oriented to permit the positioning between the annular ring parts and the removal of each circumferential portion by radial translation.

10 Claims, 6 Drawing Sheets

(56) References Cited

U.S. PATENT DOCUMENTS

| | | | | |
|---|---|---|---|---|
| 4,196,947 A * | 4/1980 | Ziegler | ............... | B60B 33/0002 |
| | | | | 384/592 |
| 4,400,042 A * | 8/1983 | Fritz | ....................... | F16C 19/14 |
| | | | | 384/615 |
| 5,114,248 A * | 5/1992 | Harsdorff | .............. | B60B 27/001 |
| | | | | 384/473 |
| 5,125,756 A * | 6/1992 | Bossier Jr. | ............ | F16C 19/385 |
| | | | | 384/572 |
| 5,129,156 A * | 7/1992 | Walker | ...................... | B61C 9/50 |
| | | | | 29/803 |
| 5,143,458 A * | 9/1992 | Alff | ......................... | G01P 3/443 |
| | | | | 384/446 |
| 6,767,133 B2 * | 7/2004 | New | ....................... | F16C 17/03 |
| | | | | 384/309 |
| 6,865,809 B2 * | 3/2005 | Vorbeck | ................ | F16C 19/364 |
| | | | | 29/407.05 |
| 7,594,760 B2 * | 9/2009 | Goss | ..................... | F16C 35/061 |
| | | | | 384/500 |
| 8,353,633 B2 * | 1/2013 | Griffin | .................... | F16C 23/10 |
| | | | | 384/215 |
| 2015/0016761 A1 * | 1/2015 | Akita | ...................... | E02F 9/006 |
| | | | | 384/125 |
| 2016/0218582 A1 * | 7/2016 | Saiki | ...................... | H02K 5/161 |
| 2017/0284459 A1 * | 10/2017 | Sugimoto | ............. | F16C 19/183 |

FOREIGN PATENT DOCUMENTS

| | | | | | |
|---|---|---|---|---|---|
| GB | | 800428 A | * | 8/1958 | ............. B66C 23/84 |
| GB | | 1392641 A | * | 4/1975 | ............. F16C 33/61 |
| GB | | 1392641 A | | 4/1975 | |

* cited by examiner

BEARING HAVING A SHIM BETWEEN TWO RING PARTS

CROSS REFERENCE TO RELATED APPLICATIONS

This application claims priority to European patent application no. 15306310.2 filed on Aug. 25, 2015, the contents of which are fully incorporated herein by reference.

FIELD OF THE INVENTION

The present invention relates to the field of bearings, such as bearings including rows of rolling elements, such as rollers or balls, inserted between rings.

BACKGROUND OF THE INVENTION

When one of the rings provides two annular ring parts cooperating with the row of rolling elements, there is difficulties to position correctly these parts axially one relative to the other, easily and without induce undesired stress on the rolling elements.

The present invention aims to resolve these difficulties.

BRIEF SUMMARY OF THE INVENTION

According to one embodiment, it is proposed a bearing comprising at least two rings able to pivot relative to one another, at least one of the rings comprising at least two annular ring parts having annular radial surfaces axially opposite each other, the bearing comprising further: at least one annular shim interposed between the radial surfaces of the annular ring parts and comprising successive circumferential portions, each circumferential portion of the shim having a plurality of nicks respectively traversed by axial elements, the nicks of each circumferential portion of the annular shim being shaped and oriented to permit the positioning between the annular ring parts and the removal of each circumferential portion by radial translation.

So, the annular shim is substantially continuous all along the circumference and is positioned correctly.

At least some of the axial elements can be carried by at least one of the annular ring parts and form abutments cooperating with the circumferential portions in the nicks thereof in order to position the circumferential portions relative to the annular ring parts.

At least some of the axial elements can be formed by screws securing the annular ring parts together.

At least some of the axial elements can be formed by screws securing the annular ring parts to a frame.

At least some of the nicks of each circumferential portion of the annular shim can have a bottom and opposite sides parallel to the direction of the translation.

The nicks of each circumferential portion can be opened from the outside to the inside.

The nicks of each circumferential portion can be opened from the inside to the outside.

The circumferential portions can have identical shapes.

The annular shim can provide more than two circumferential portions extending respectively along angles lower than 180°.

The annular shim can provide two circumferential portions extending respectively along an angle of 180°.

BRIEF DESCRIPTION OF THE SEVERAL VIEWS OF THE DRAWING

Bearings according to the present invention will now be described as examples and illustrated on the drawing in which.

DETAILED DESCRIPTION OF THE INVENTION

Figure 1:
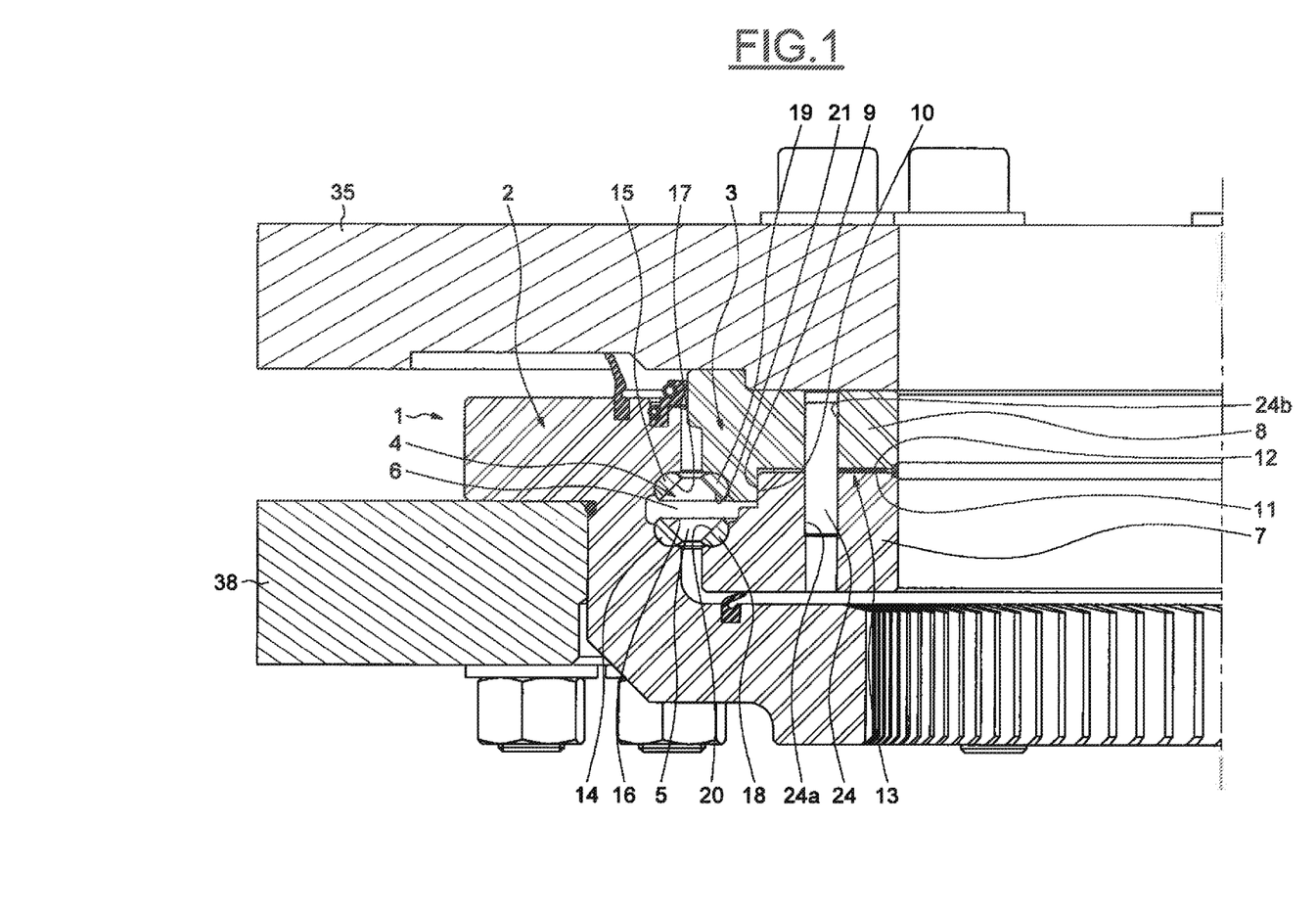
FIG. 1 is a local radial section of a bearing.
Figure 2:
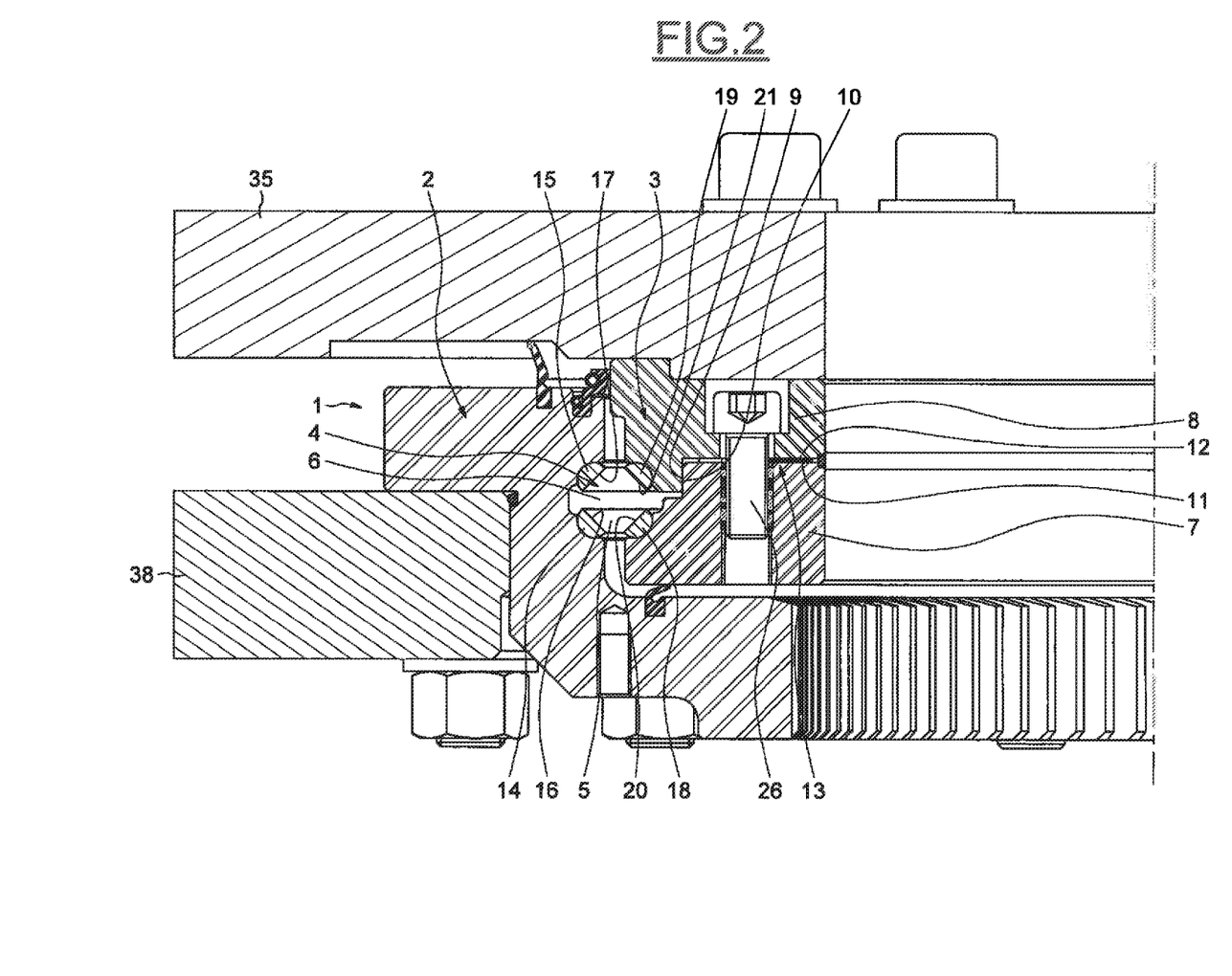
FIG. 2 is another radial section of the bearing of FIG. 1.
Figure 3:
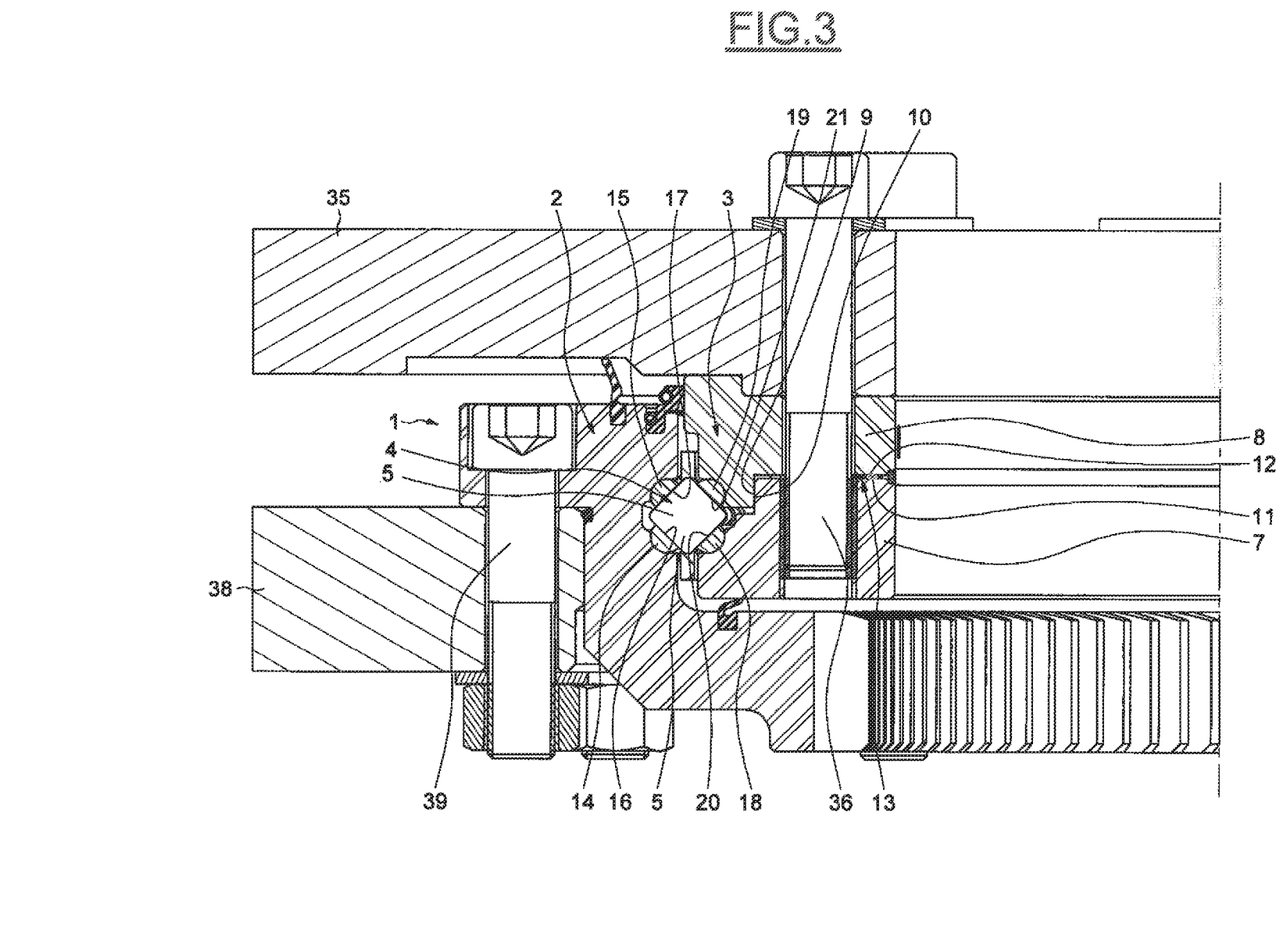
FIG. 3 is another radial section of the bearing of FIG. 1.

As illustrated in FIGS. 1 to 3, according to an embodiment, a bearing 1 provides an outer ring 2 and an inner ring 3 which are concentric and rotatable about an axis (not shown).

For supporting and transmitting radial and axial loads, a row 4 of rolling elements 5, such as rollers, is interposed between the outer ring 2 and the inner ring 3, the rolling elements 5 being circumferentially spaced apart by means of a cage 6.

The outer ring 2 is made of one-piece and the inner ring 3 provides two annular ring parts 7 and 8 which are axially adjacent.

The annular ring parts 7 and 8 are provided with adjacent cylindrical surfaces 9 and 10 for maintaining these parts radially one relative to the other and for permitting axial motion one relative to the other.

The annular ring parts 7 and 8 are provided with annular radial surfaces 11 and 12 which are axially opposite each other, these surfaces extending from ends of the cylindrical surfaces toward the inside.

An annular radial shim 13 is interposed between the radial surfaces 11 and 12 of the annular ring parts. The thickness of the annular shim 13 determines the axial positions of the annular ring parts 7 and 8 one relative to the other.

Two annular wires 14 and 15 are secured to the outer ring 2 and determine two outer raceways 16 and 17 which are axially spaced apart.

Two annular wires 18 and 19 are secured respectively to the annular ring parts 7 and 8 of the inner ring 2 and determine two inner raceways 20 and 21 which are axially spaced apart.

The row 4 of rolling elements 5 is placed in the space determined by the outer raceways 16 and 17 and the inner raceways 20 and 21, on which the rolling elements 5 are in contact and guided circumferentially.

As an example, the outer ring 2 and the annular ring parts 7 and 8 of the inner ring 3 can be made of aluminum or an aluminum alloy, the annular wires 14, 15, 16 and 17 can be made of a steel and the radial shim 13 can be made of a steel.

Figure 4:
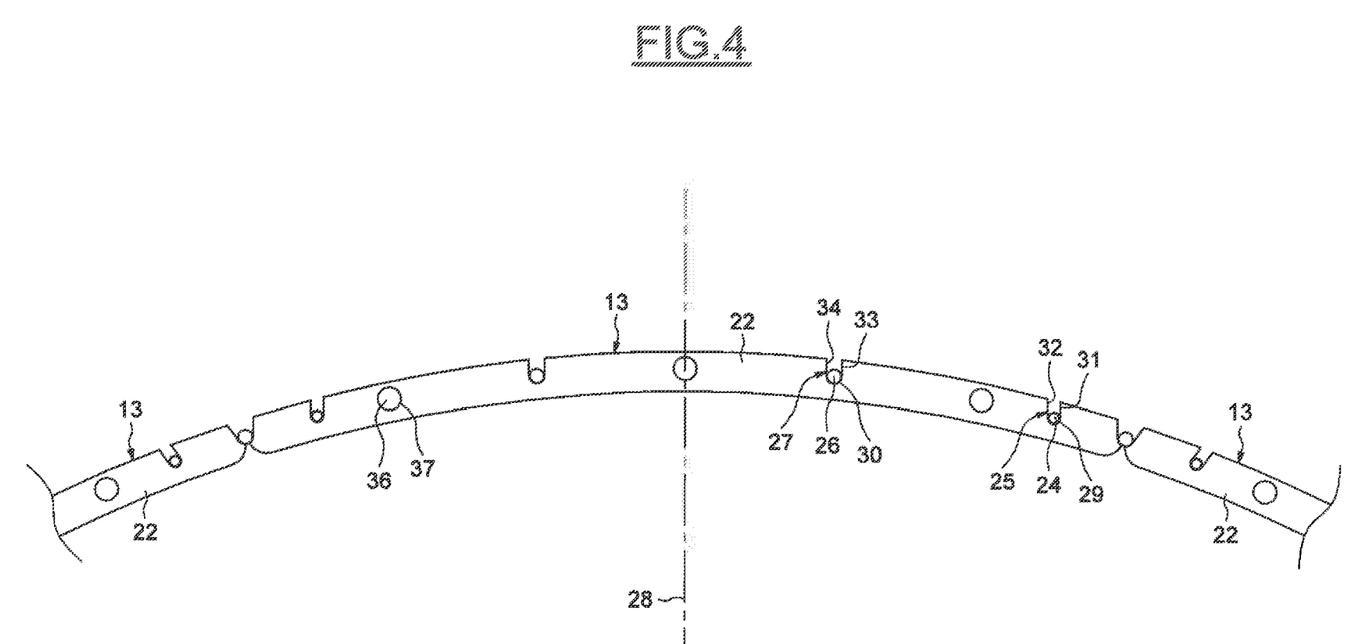
FIG. 4 is a local top view of a shim of the bearing of FIG. 1.

As illustrated on FIG. 4, the annular radial shim 13 is divided or segmented circumferentially and provides successive circumferential portions 22 which extend along angular sectors and are formed as local radial sheets. The circumferential portions 22 can be obtained by laser cutting of a sheet.

In this embodiment, the annular radial shim 13 provides more than two circumferential portions 22, which are preferably identical.

As illustrated on FIGS. 1 and 4, the annular ring parts 7 and 8 are provided with a plurality of positioning axial pins 24 which are spaced apart circumferentially and introduced in axial holes 24a and 24b of the annular ring parts 7 and 8.

The positioning axial pins 24 traverse the annular radial shim 13. More specifically, two axial pins 24 traverse two positioning nicks 25 provided through each circumferential portion 22, at a short distance from the ends of this portion 22.

As illustrated on FIGS. 2 and 4, the annular ring parts 7 and 8 are secured one on the other by means of axial screws 26 which are spaced apart circumferentially and which traverse the annular radial shim 13. More specifically, the screws 26 traverse nicks 27 provided through the circumferential portions 22.

The positioning pins 24 and the axial screws 26 are disposed on the same circumference.

The nicks 25 and 27 of each circumferential portion 22 are opened towards the outside and are shaped and oriented to permit, when the annular ring parts 7 and 8 are axially away, the positioning between the annular ring parts 7 and 8 and the removal of each circumferential portion 22 by radial translations along a radial direction 28 passing through the middle of each circumferential portion 22.

More particularly, the nicks 25 and 27 of each circumferential portion 22 are oblong and have respectively bottoms 29 and 30 and opposite sides 31, 32 and 33, 34 which are parallel to the corresponding direction 28.

So, when the annular ring parts 7 and 8 are axially away, each circumferential portion 22 can be placed by radial translation along the corresponding radial direction 28 from the inside towards the outside such that the corresponding positioning pins 24 enter in the nicks 25 and that the circumferential portion 22 is guided by the corresponding pins 24 between the sides 31 and 32 of the corresponding positioning nicks 25, until the bottoms 29 of the positioning nicks 25 abut the positioning pins 24 laterally. At the same time, the shafts of the screws 26 enter in the nicks 27 and moved towards the bottoms 30 of the nicks 27, freely and with a clearance.

When all the circumferential portions 22 are positioned or in place, the screws 26 are blocked in order to compress the annular radial shim 13 between the radial surfaces 11 and 12 of the annular ring parts 7 and 8 and secure these annular ring parts 7 and 8 together.

The bearing 1 is in operating condition.

If the annular radial shim 13 has to be removed, after unblocking of the screws 26, the circumferential portions 22 are moved by radial translations from the outside to the inside along the corresponding directions 28. New circumferential portions 22 having another thickness can be positioned as above described.

As illustrated on FIGS. 3 and 4, the bearing 1 being assembly, the inner ring 3 is mounted on an annular frame 35 by means of axial screws 36 spaced apart circumferentially and disposed on the same circumference than the axial pins 24 and the axial screws 26.

The shaft of the screws 36 traverse the annular ring part 8 and are secured to the annular ring part. The shafts of the screws 36 traverse, freely and with a clearance, holes 37 of the circumferential portions 22 of the annular radial shim 13. Nevertheless, the holes 37 could be also nicks opened. Moreover, the outer ring 2 is mounted on an annular frame 38 by means of axial screws 39.

Figure 5:
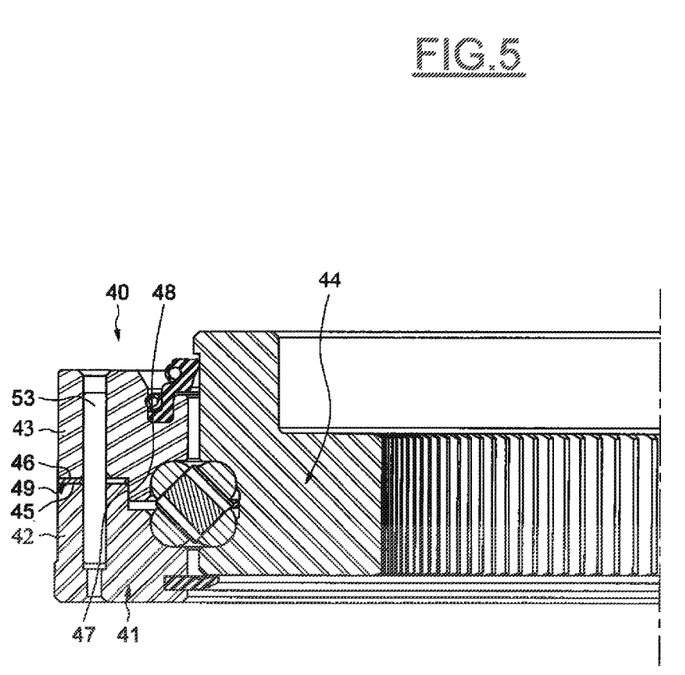
FIG. 5 is a local radial section of another bearing.
Figure 6:
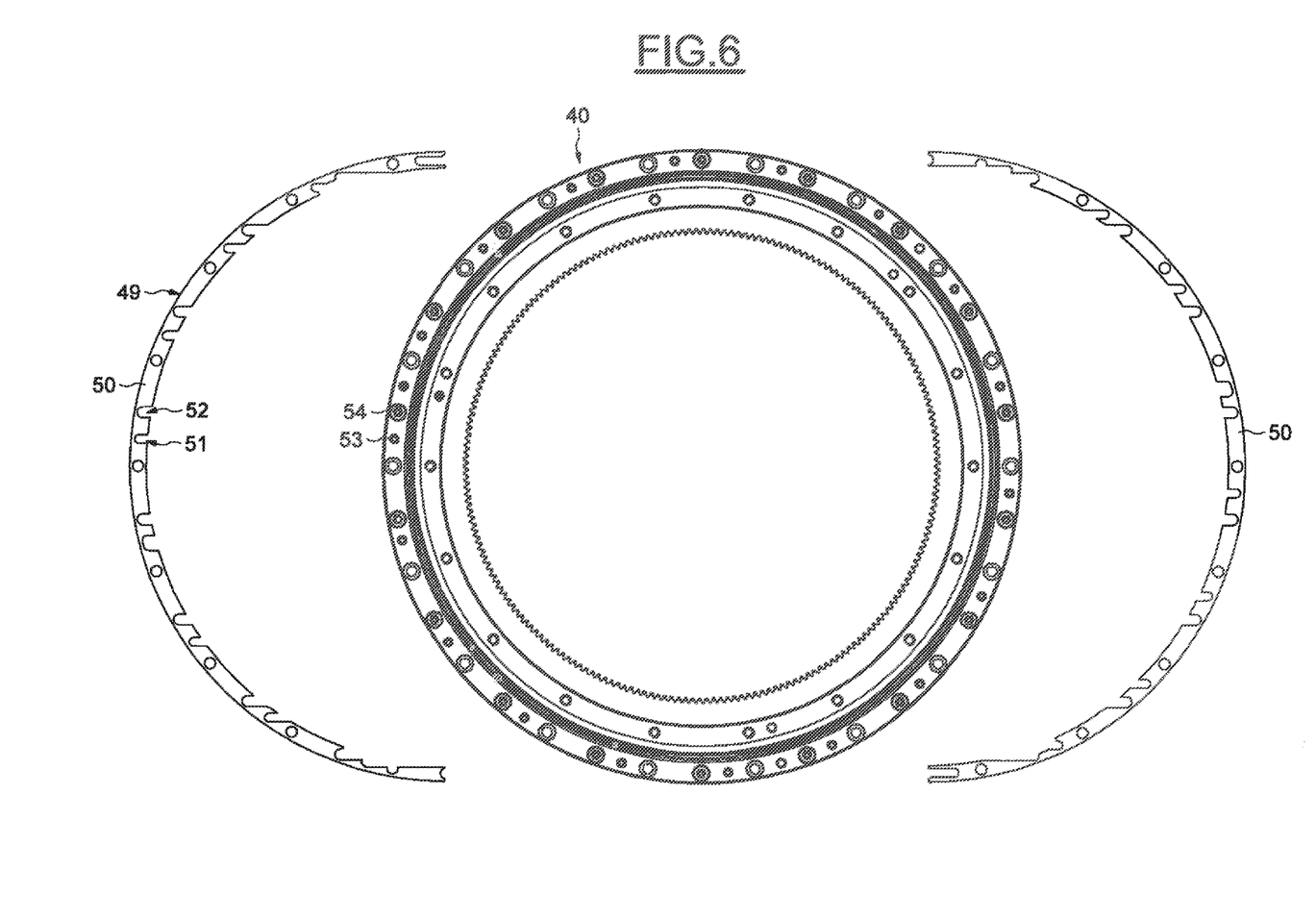
FIG. 6 is an exploded top view of the bearing of FIG. 5.

As illustrated in FIGS. 5 and 6, according to another embodiment, a bearing 40 is different from the bearing 1 by the fact that it provides an outer ring 41 comprising two annular ring parts 42 and 43 which are axially adjacent and a one-piece inner ring 44. The annular ring parts 42 and 43 and the one-piece inner ring 44 are equipped with annular wires inverted relative to the bearing 1 and defining raceways for a row of rolling elements.

In this embodiment, the annular ring parts 42 and 43 have opposite annular radial surfaces 45 and 46 extending from adjacent cylindrical surfaces 47 and 48 towards the outside.

A segmented annular radial shim 49 is inserted between the annular radial surfaces 45 and 46 and provides successive circumferential portions 50.

In this embodiment, the segmented annular radial shim 49 provides two circumferential portions 50 which extend respectively along an angle of 180° and which are preferably identical. Nevertheless, the segmented annular radial shim 49 could provide more than two circumferential portions 50.

In this embodiment, each circumferential portion 50 is provided with nicks 51 and 52 which corresponds to the nicks 25 and 27 but which are opened towards the inside.

When the annular ring parts 42 and 43 are axially away, each circumferential portion 50 can be moved from the outside towards the inside along a radial direction in order to be positioned between the annular ring parts 42 and 43 such that the nicks 51 and 52 receive laterally positioning pins 53 and shafts of screws 54 connecting the annular ring parts 42 and 43 and equivalent to the pins 24 and the screw 26 of the bearing 1.

Each circumferential portion 50 can be moved from the inside towards the outside along this radial direction in order to be removed.

The described bearings have the following advantages.

As the circumferential portions constituting the annular radial shims cooperate with at least two elements formed by positioning axial pins inserted in nicks thereof, the circumferential portions occupy determined positions radially and circumferentially with respect to the annular ring parts constituting the outer ring or the inner ring of the bearing.

The positioning and the removal of the circumferential portions constituting the annular radial shims can be executed easily and quickly.

As the annular radial shims extend substantially all along a circumference, there is no gap between the annular parts constituting the rings and axial deformations of these parts one relative to the other under the effect of the fixing screws are avoided and inappropriate stress on the row of rolling elements are avoided.

In this description, the bearings provide one row of rolling elements. Nevertheless, the present invention can be applied to bearings having several rows of rolling elements. The invention can also applied to bearings which have no rolling element, such as dry sliding bearings.

The invention claimed is:

1. A bearing comprising:
an inner ring formed by a first annular ring part and a second annular ring part, the first annular ring part having a first annular radial surface and the second annular ring part having a second annular radial surface, the first and second radial surfaces being axially spaced from and axially overlapping each other,
an outer ring formed by a one piece member, the outer ring both radially and axially overlapping the inner ring, the outer ring able to pivot relative to the inner ring, a plurality of axial elements located in the first and second annular ring parts, the plurality of axial elements comprising at least one fastener and at least one pin, at least one annular shim disposed between the first and second radial surfaces of the first and second annular ring parts such that the first and second annular radial surfaces are axially spaced from each other, the at least one annular shim comprising successive circumferential portions, each circumferential portion of the annular shim including a plurality of nicks, the plurality of nicks each extending from a position on the circumferential portion to form an opening on a radially outer edge of the circumferential portion, the plurality of axial elements each traversing a separate one of the plurality of nicks, the nicks of each circumferential portion of the annular shim being shaped and oriented to permit the positioning of the annular shim between the annular ring parts and the removal of each circumferential portion by radial translation.

2. The bearing according to claim 1, wherein at least some of the plurality of axial elements are carried by at least one of the first and second annular ring parts so as to abutingly align nicks in the circumferential portions in order to position the circumferential portions relative to the annular ring parts.

3. The bearing according to claim 1, wherein at least some of the axial elements are formed by a plurality of screws securing the first and second annular ring parts together.

4. The bearing according to claim 1, wherein at least some of the axial elements are formed by screws securing the first and second annular ring parts to a frame.

5. The bearing according to claim 1, wherein at least some of the nicks of each circumferential portion of the annular shim have a bottom and opposite sides parallel to the direction of the translation.

6. The bearing according to claim 1, further comprising at least one annular wire located on the outer ring and forming an outer raceway thereon.

7. The bearing according to claim 6, further comprising a first annular wire located on the first annular ring part and forming a first inner raceway and a second annular wire located on the second annular ring part and forming a second inner raceway.

8. The bearing according to claim 1, wherein the circumferential portions have identical shapes.

9. The bearing according to claim 1, wherein the annular shim includes more than two circumferential portions extending respectively along angles lower than 180°.

10. The bearing according to claim 1, wherein the annular shim includes two circumferential portions extending respectively along an angle of 180°.

* * * * *